July 15, 1930. T. A. BOTH 1,770,766
DIE FOR MOLDING INSULATING MATERIALS
Filed Nov. 4, 1926 3 Sheets-Sheet 2

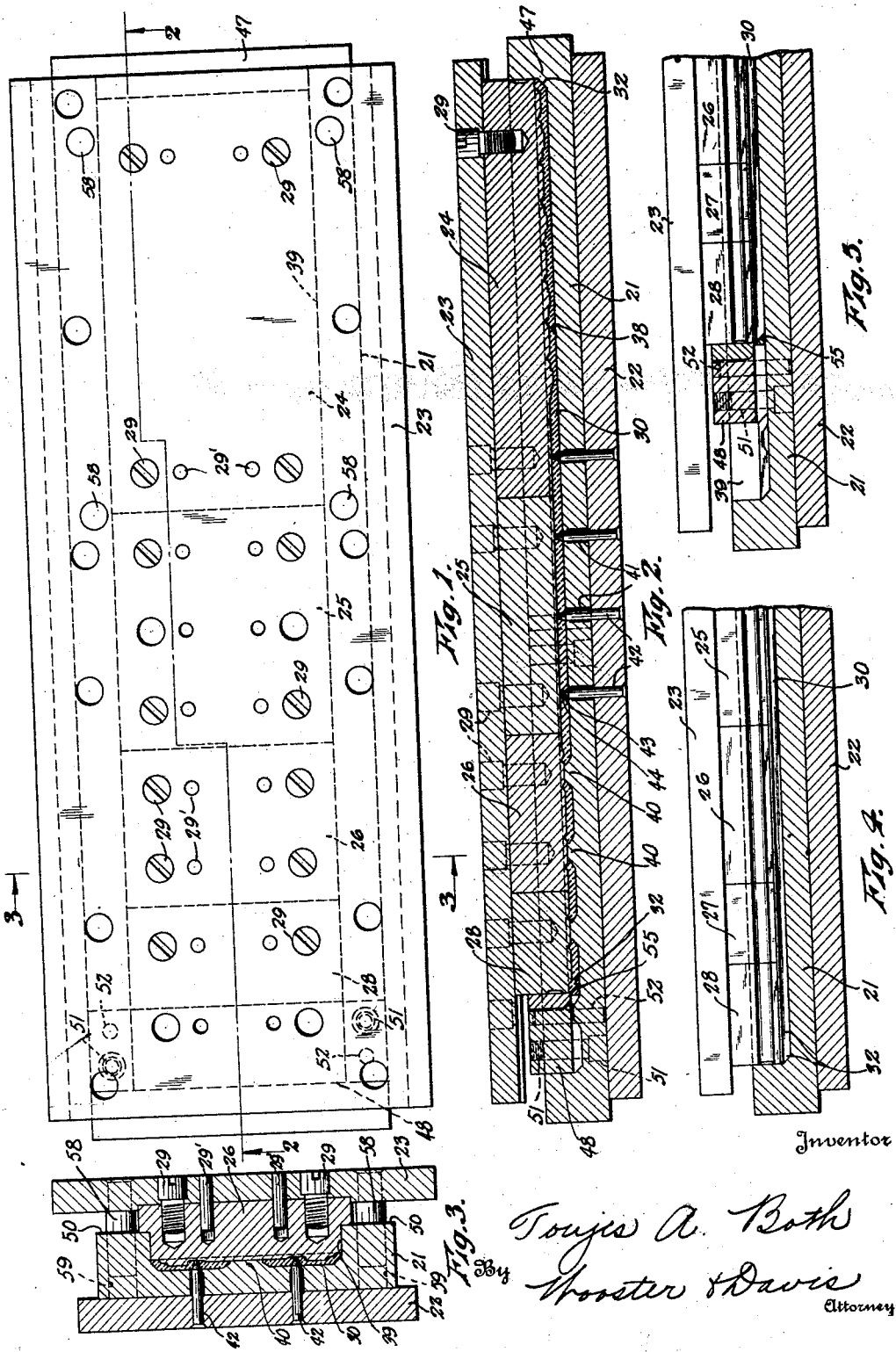

Inventor
Toujes A. Both
By Wooster & Davis
Attorneys

July 15, 1930.  T. A. BOTH  1,770,766
DIE FOR MOLDING INSULATING MATERIALS
Filed Nov. 4, 1926   3 Sheets-Sheet 3

Inventor
Toujes A. Both
By Wooster & Davis
Attorneys

Patented July 15, 1930

1,770,766

UNITED STATES PATENT OFFICE

TONJES A. BOTH, OF STRATFORD, CONNECTICUT, ASSIGNOR TO THE CONNECTICUT ELECTRIC MANUFACTURING COMPANY, OF BRIDGEPORT, CONNECTICUT, A CORPORATION OF CONNECTICUT

DIE FOR MOLDING INSULATING MATERIALS

Application filed November 4, 1926. Serial No. 146,200.

This invention relates to a die for molding insulating material, and more specifically to a die for molding cover plates for the gang installation of electrical devices, such as, for example, a plurality of switches mounted in a single outlet box, and has for its principal object to provide a die which may be adjusted so that the same die may be used to mold different sized plates, that is, plates for use with different numbers of electrical devices, and it is, therefore, not necessary to form a plurality of dies to mold different sizes or lengths of plates as all the plates may be made in the same die.

With the foregoing and other objects in view, I have devised a construction, the preferred form of which is illustrated in the accompanying drawings, forming a part of this specification. In these drawings, Fig. 1 is a top plan view of the die complete.

Fig. 2 is a longitudinal section thereof substantially on line 2—2 of Fig. 1.

Fig. 3 is a transverse section substantially on line 3—3 of Fig. 1.

Fig. 4 is a longitudinal section of the lower portion of the die at one end thereof, and the upper portion of the die in elevation.

Fig. 5 is a view similar to Fig. 4, but showing some of the die sections removed and the end filler piece in position.

Fig. 15 is an end view thereof.

Fig. 17 is a top plan view of the lower or female die block.

Figure 6:
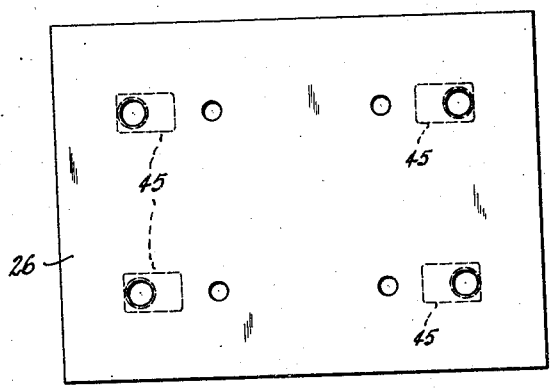
Fig. 6 is a top plan view of one of the die sections as used for a two gang section of the plate.
Figure 7:
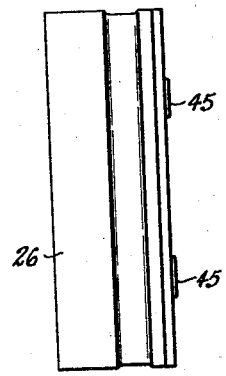
Fig. 7 is an end view thereof.
Figure 8:
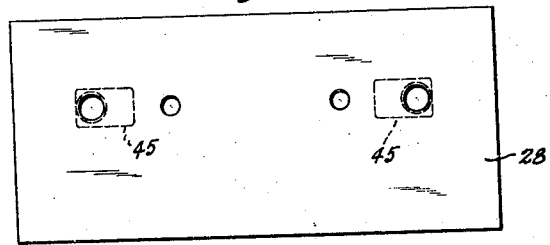
Fig. 8 is a top plan view of the die section for a single gang and used at the end of the plate.
Figure 10:
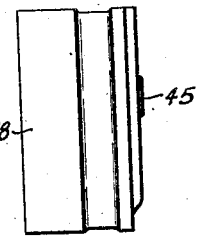
Fig. 10 is an end view thereof.
Figure 9:
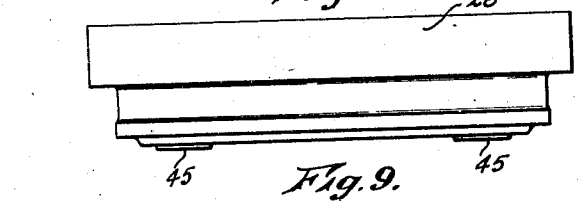
Fig. 9 is a side elevation thereof.
Figure 11:
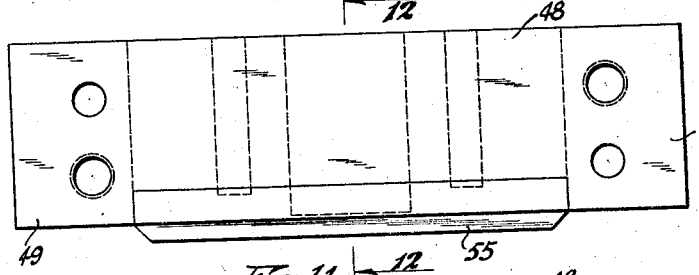
Fig. 11 is a top plan view of the filler piece for use in forming the end of the plate when a plate smaller than the capacity of the die is made.
Figure 12:
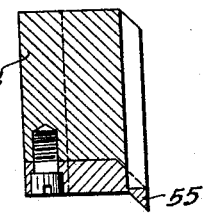
Fig. 12 is a transverse section thereof substantially on line 12—12 of Fig. 11.
Figure 13:
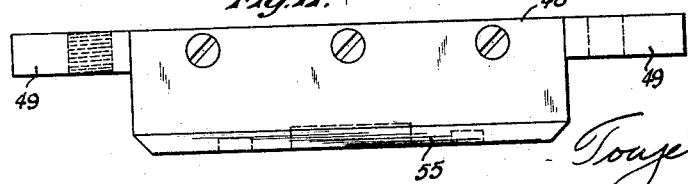
Fig. 13 is a side elevation looking toward the bottom of Figs. 11 and 12.
Figure 14:
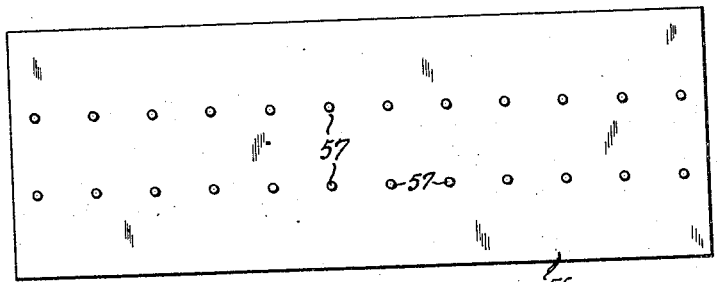
Fig. 14 is a plan view of the ejector plate.
Figure 13:
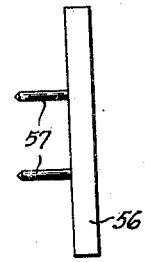

It is common practice where a number of electrical devices are to be operated or used at a single station, to mount them side by side in a single outlet box and, of course, the length of the box will depend upon the number of the devices or fixtures used. It is also usual in these installations to use a single cover or face plate for the entire installation or gang in a single box, and it will, therefore, be apparent that if a die is made for each plate it will require as many dies as there are plates used, there being a die for a single plate, another die for a double plate, and so on up to the maximum size of gang installation used. It will be obvious that this large number of dies would involve considerable expense and also would require considerable storage space. I have overcome these objections by making a die in which any size of gang cover plate may be made from a plate required for a single fixture up to the plate required for the maximum number of fixtures. In the die illustrated in the drawings I may make a plate for a single switch or I may make a plate for a twelve gang installation using twelve switches in a single outlet box, or I can make the plate for an installation comprising any intermediate number of switches.

This die as illustrated comprises a lower portion including a lower or female die block 21 and a bottom plate 22, and an upper die block comprising a support 23 and one or more die sections 24, 25, 26, 27 and 28. It will be understood that in making the plates any one of these sections or any combination thereof may be used depending upon the length of the plate required. As illustrated the section 24 is a five gang section, that is, it is of a length to mold one side of a plate required for five gangs, or, that is, five switches in the specific construction shown. Section 25 is a three gang section, that is, it is of a length and shape to mold the section of plate for three switches. Section 26 is a two gang section. Section 27 is a one gang section used in an intermediate portion of the plate, and section 28 is a one gang section used at the outer end of the plate. These sections are all detachably mounted on the under side of the support 23 by any suitable means, such as screws 29, and these attaching screws are so located as to be used for any section. Dowel pins 29' are also used to accurately position the sections. It will, therefore, be apparent that if I omit, for example section 27, which is a one gang section, and shift section 28 next to section 26, I can make an eleven gang plate; while if I omit section 25, which is a three gang section, and section 27, which is a one gang section, and move sections 26 and 28 over adjacent section 24, I can make an eight gang plate, and so on throughout the entire range from one to twelve, or from one to the maximum number of gangs for which the die is constructed.

Figures 18, 19:
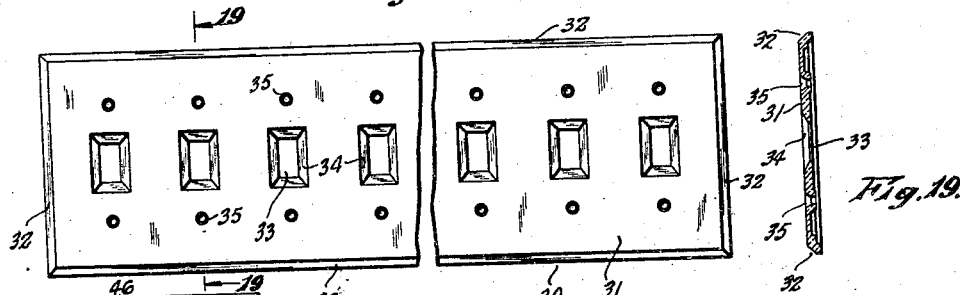
Fig. 18 is a front elevation of a gang plate which may be molded in the die illustrated.
Fig. 19 is a transverse section thereof substantially on line 19—19 of Fig. 18.
Figure 20:
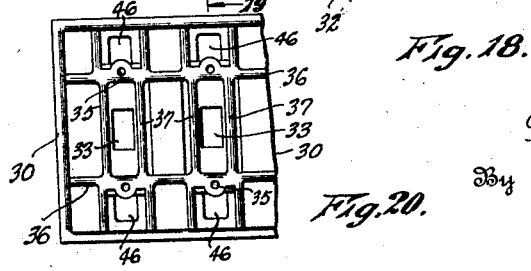
Fig. 20 is a rear elevation of the portion adjacent one end of this plate.

In the form of cover plate for which the die illustrated is designed, the plate 30, as shown in Fig. 18, has a front surface 31 which is substantially flat and is provided with a bevel 32 extending throughout its periphery. It also has rectangular openings 33 for the operating lever of the switch and which openings are surrounded by a depression having beveled side walls 34. At the opposite ends of each opening is also a countersunk opening 35 for the usual attaching screws, it being understood that there is ordinarily a pair of these screws for each device or fixture. On its rear surface the plate is usually provided with longitudinal and transverse strengthening ribs 36 and 37 respectively, as indicated in Fig. 20. As each fixture in the box, in the present illustration the switches, occupies the same space, it will, of course, be apparent that the openings 33, the screw openings 35 and the transverse strengthening ribs are uniformly spaced throughout the length of the plate, or, in other words, they are duplicated for each fixture. I, therefore, make the lower die block 21 with the bottom face 38 of the recess or chamber 39 with upwardly extending projections or raised portions 40 shaped and located to correspond with the openings and bevels 33 and 34 in the plate, and in the present instance there are twelve of these lugs as the maximum capacity of the die illustrated is a twelve gang plate. The bottom wall of the die block 21 is also provided with openings 41 located to correspond with the location of the screw openings 35, and these openings are adapted to receive pins 42 mounted on the bottom plate 22. The upper ends of these pins are beveled or tapered at 43 and have a cylindrical projection 44 at the smaller end thereof, and the length of these pins is preferably such that the largest part of the taper is in substantial alignment with the bottom surface 38 of the recess corresponding to the front wall of the plate to be molded and is of a height so that they just project through the molded plate, that is, the length of the taper 43 and the projection 44 may be the same as the thickness of the plate 30 at the location of the screw openings. If different shaped openings are desired the pins will be shaped accordingly.

Figure 16:
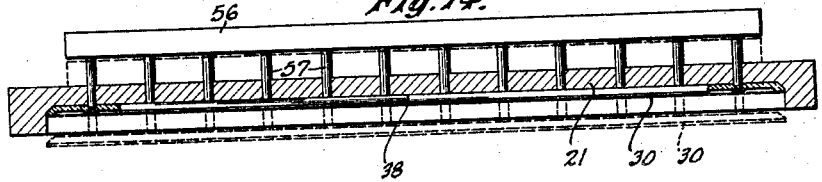
Fig. 16 is a longitudinal section through the lower die block reversed and showing the use of the ejector plate.
Figure 12:
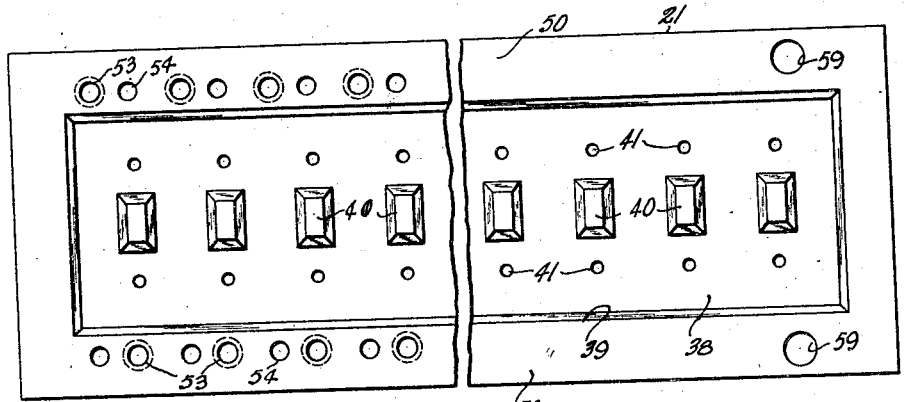

As is ordinary in forming these kinds of plates, to give a neat and attractive appearance they are beveled at their ends and longitudinal side edges, as indicated at 32, Figs. 18 and 19, and also in Figs. 2, 3 and 16. Therefore, the section 24 of the upper die block which is used to mold the top of the plate at one end is correspondingly shaped at this end while the section 28 which is used to mold the other end of the plate is also correspondingly shaped at its opposite end. The intermediate sections, however, 25, 26 and 27 are used only to mold intermediate portions of the plate and they are, therefore, shaped the same at both ends. The lower or inner surfaces of these sections are provided with grooves to form the ribs 36 and 37 on the back side of the plate 30, or that is, the top side when it is in the die, and they also have projections or raised lugs 45 which will form recesses 46 in the rear face of the plate and adjacent the screw openings 35 to receive the head of the usual attaching yokes, not shown, ordinarily used in this type of construction to support the electrical devices in the outlet box, and which also have threaded openings to receive the attaching screws which pass through the openings 35. This construction is not illustrated as it is the usual construction and forms no part of my present invention.

It will also be apparent from Figs. 2 to 5 that the opposite ends of the die block 21 are shaped to form a bevel at the ends of the plate 30. However, as there is no surface for forming this bevel intermediate these two ends, if it is desired to make a plate of less length than the maximum, that is, in the present illustration a plate of less than twelve gangs, some means must be provided to form the bevel on the end of this plate opposite to the end 47 of the block 21. This is done by means of a filler block 48. This is a block which is adapted to extend into the recess or chamber 39 and has side wings 49 adapted to rest on the top surface 50 of the block 21 at the opposite sides of the recess, and it may be secured in different positions along the length of this block by means of screws 51 and dowel pins 52, there being, of course, openings 53 and 54 suitably spaced along the sides of the die block 21 to properly locate this filler block for different lengths of plates to be molded. This block when in position engages the outer end of the end section 28, as shown in Figs. 2 and 5, and has along its inner lower side edge a beveled rib or extension 55 which engages the surface 38 of the recess and forms the bevel at that end of the molded plate.

The operation is as follows: The die sections 24, 25, 26, 27 and 28 or any number of them are secured to the support 23 in the proper position as above described for the size of plate 30 which it is desired to mold, and the filler block 48 is properly positioned in the lower die block 21 to coact with the section 28 to form that end of the plate. The bottom plate 22 is placed under the lower die block with the pins 42 in position, as shown in Fig. 2, with their upper tapered ends projecting above the bottom surface of the recess 39. A required amount of insulating material, for example, powdered bakelite, is then placed in the recess or chamber 39 over the surface thereof and then the top die block is inserted as shown in Figs. 2 and 3. This top block is properly positioned relative to the lower die block and maintained in this position by studs 58 carried by the block and adapted to enter the holes 59 in the lower die block and be guided thereby. The whole die assembly may then be placed under pressure between the two heated plates of a press, or the whole die may be heated before being placed in the press in order to heat the molding material. The press will press the two sections of the die together and properly mold the plate 30. The die is then removed from the press and the top die block comprising the support 23 and the die sections 24 to 28 may be removed by lifting it off from the lower section. The molded plate may have a tendency to stick in the lower die block. It may be easily removed, however, by inverting this die block 21 after the upper die block has been removed to the position shown in Fig. 16, and then the bottom plate 22 with the pins 42 may be removed. I then place on this die block the ejector plate 56, which may be a block of metal, and it carries a plurality of pins 57 corresponding in size and position to the pins 42, but of greater length so that as they are placed in position with the ends of the pins in the countersunk openings 35 in the molded plate the ejector plate 56 will be located somewhat above the bottom wall of the block 21. If now a pressure is placed on the top of this ejector plate the pins 57 will force the molded plate from the die block, or the same effect may be secured by lifting the die block 21 and ejector plate 56 a short distance and allowing them to drop, when the mass of the plate 56 will force the molded plate 30 from the die.

It will be apparent from the foregoing description that in this die construction I may easily mold any size of gang plate from the smallest to the largest for which the die is designed, and I, therefore, need to construct only a single die to mold all of these different sizes of plates instead of being required to make a separate die for each size of plate. It will also, of course, be understood that, although I have shown the bottom surface 38 of the recess in the lower die block and the surfaces of the die sections of the upper die block shaped to form a plate for toggle switches having a swinging lever, I may so shape these surfaces as to form plates for push switches or other types of switches, or I may shape them to form plates for other types of electrical devices as receptacles and so forth.

Having thus set forth the nature of my invention, what I claim is:

1. In a die for molding insulating material into a one piece cover plate for a multi-gang outlet box, a pair of nesting die members adapted to cooperate to mold the material into the element desired, the inner member including a support and a plurality of die sections detachably secured to the support each conforming to at least a single gang, the size of the element molded being determined by the size and number of the sections used.

2. In a die for molding insulating material into a one piece cover plate for a multi-gang outlet box, a pair of die blocks, one of said blocks being provided with an oblong recess or chamber to receive the material to be molded, and the other block including a support and a plurality of die sections arranged side by side and adapted to enter said recess each conforming to a single gang or a multiple thereof, and means for detachably securing the die sections to the support at different positions to adjust the effective length of said block and the length of the plate molded.

3. In a die for molding insulating material into a one piece multi-gang cover plate, a pair of die blocks, one of said blocks being provided with a recess or chamber to receive the material to be molded, and the other block having a die portion to extend into the recess to cooperate with the walls thereof, said latter block including means to adjust the length of said die portion, a filler block adapted to cooperate with one end of said die portion to form an end of the plate molded, and means for securing the filler block in the recess adjacent an end of the die portion.

4. In a die for molding insulating material into a one piece cover plate, a pair of die blocks, one of said blocks being provided with a recess or chamber to receive the material to be molded and having its bottom wall formed to shape one side of a multi-gang plate, and the other block having a die portion to extend into the recess to cooperate with the walls thereof to shape the other side of said plate, said latter block including means to adjust the length of said die portion to increase or decrease the number of gangs in the finished plate.

5. In a die for molding insulating material into a single article, a pair of die blocks, one of said blocks being provided with a recess or chamber to receive the material to be molded, and the other block comprising a support and a die portion comprising a plurality of sections detachably secured to the support and adapted to enter the recess, and a filler block in the recess forming an end piece to cooperate with said die portion to form an end of the article molded, and means for securing the filler block to the first block in different positions and adjacent an end of the die portion.

6. In a die for molding insulating material, a die block having a recess or chamber having a bottom wall shaped to form one face of a one piece gang cover plate for electrical fixtures, a second die block comprising a support and a die portion including a plurality of separate sections detachably secured to the support, the sections being adapted to enter the recess and shaped on their inner faces to form the other side of the gang plate, and each section being formed to form the surface of the plate required for at least one fixture.

7. In a die for molding insulating material, a die block having a recess or chamber having a bottom wall shaped to form one face of a one piece gang cover plate for a plurality of electrical devices, a second die block comprising a support and a plurality of die sections detachably secured to said support to extend into the recess, each section being shaped on its inner face to form the rear surface of a length of plate corresponding to a multiple of the length used for each device.

8. In a die for molding insulating material, a die block having a recess or chamber having a bottom wall shaped to form one face of a one piece gang cover plate for a plurality of electrical devices, a second die block comprising a support and a plurality of die sections detachably secured to said support to extend into the recess, each section being shaped on its inner face to form the rear surface of a length of plate corresponding to a multiple of the length used for each device, and a filler block secured in the recess to cooperate with the end die section to form an end of the plate, and means to secure the filler block in different adjusted positions and adjacent one side of the end die section.

9. In a die for molding a one piece element of insulating material, a pair of nesting die members adapted to cooperate to mold the material into the element desired, the inner member including a support and a plurality of die sections detachably secured to the support, the outer member including a die block and a shiftable filler block, and means for securing the filler block to the die block in different positions and adjacent an end die section, the size of the element being determined by the movement of the filler block and number of sections used.

In testimony whereof I affix my signature.

TONJES A. BOTH.